Jan. 25, 1966   G. M. VANATOR   3,231,813
APPARATUS FOR DETECTING GEAR WHEEL DIMENSIONAL VARIATIONS
Original Filed Oct. 25, 1954   4 Sheets-Sheet 1

INVENTOR.
George M. Vanator
BY
Hugh L. Fisher
ATTORNEY

Jan. 25, 1966 G. M. VANATOR 3,231,813
APPARATUS FOR DETECTING GEAR WHEEL DIMENSIONAL VARIATIONS
Original Filed Oct. 25, 1954 4 Sheets-Sheet 2

INVENTOR.
George M. Vanator
BY
Hugh L. Fisher
ATTORNEY

INVENTOR.
George M. Vanator
BY
Hugh L. Fisher
ATTORNEY

Jan. 25, 1966  G. M. VANATOR  3,231,813
APPARATUS FOR DETECTING GEAR WHEEL DIMENSIONAL VARIATIONS
Original Filed Oct. 25, 1954  4 Sheets-Sheet 4

INVENTOR.
George M. Vanator
BY
Hugh L. Fisher
ATTORNEY United States Patent Office 3,231,813
Patented Jan. 25, 1966

3,231,813
APPARATUS FOR DETECTING GEAR WHEEL DIMENSIONAL VARIATIONS
George M. Vanator, Milford, Mich., assignor to General Motors Corporation, Detroit, Mich., a corporation of Delaware
Original application Oct. 25, 1954, Ser. No. 464,239, now Patent No. 2,983,141, dated May 9, 1961. Divided and this application Mar. 10, 1961, Ser. No. 94,844
10 Claims. (Cl. 324—34)

This application is a division of application Serial No. 464,239, filed Oct. 25, 1954, now Patent No. 2,983,141.

This invention relates to the detection of dimensional irregularities, such as eccentricity, wobble and variations in helix angle, encountered in the manufacture of gear wheels and the like and to magnetic inspection apparatus for detecting such manufacturing errors in ferromagnetic test members of this character.

As the above terms are employed herein, eccentricity is said to exist in a gear when the rotational axis of the gear does not coincide with, but is parallel to, the geometrical axis of the gear. Wobble exists when the rotational and geometrical axes intersect at a point, which lies either between the ends or outside of the length of the gear and in a plane containing these axes or projections thereof. Variations in helix angle exist when the angles formed by the individual gear teeth with the geometrical axis of a helical gear are not equal around the gear. Such variations may be caused by slipping of the gear blanks relative to the hobber or the gear cutter, resulting in misshapen or, what is termed, slip gears. Helix angle variations also may exist where the angles made by the helical gear teeth with the geometrical axis of the gear are equal around the gear, but are different from one gear to another.

As can be appreciated, the existence of any of the aforementioned irregularities seriously interferes with efficient gear operation. This is particularly so in the case of automatic transmissions of automotive vehicles.

The present invention, thus, has among its objects to provide an apparatus for detecting manufacturing errors in gear wheels and the like and, more specifically, to provide such apparatus which can not only identify and discriminate between various faults, but which can measure such faults on a quantitative basis. Other objects are to provide a magnetic gear inspection apparatus which is automatic and specially suited for rapid high-production checking of test members of this character.

In accordance with one modification of the present invention, the gear under inspection is mounted on a true-running arbor, and a pair of axially spaced, stationary magnetic pickups, which are spaced slightly from the surface of the gear, are disposed with their pole faces or tips on a line parallel to the rotational axis of the gear. The pickups are mounted transversely to the gear near the ends therof to survey preferably adjacent gear teeth. Dimensional irregularities in the gear will cause variations in the width of the air gaps between the respective pickups and the gear and in the voltages developed by the pickups. Eccentricity and wobble tests are performed by connecting the pickups individually or in series adding or opposing relationship, and applying the resultant output to utilizing means that may include suitable visual display or indicating means and/or sorting or classifying appartus. Helix angle and related irregularities create principally a difference in phase between the alternating electrical signals developed by the pickups and may be detected by suitable phase detecting or discriminating apparatus. In accordance with another modification of the present invention, helix angle variations are most accurately detected with a pair of differentially connected pickups which are mounted in a transaxial plane to the gear or member under inspection.

The above and other objects, features and advantages, together with the manner of operation of the present invention will appear more fully from the following detailed description and drawings wherein.

Figure 6:
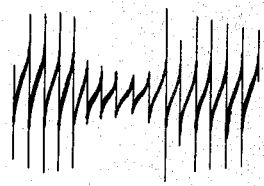
Figure 6A:
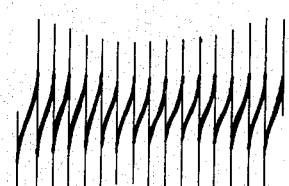
Figure 6B:
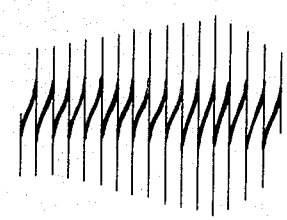
Figure 9:
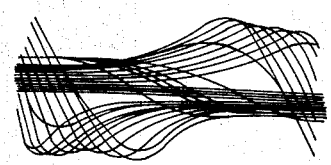
Figure 10:
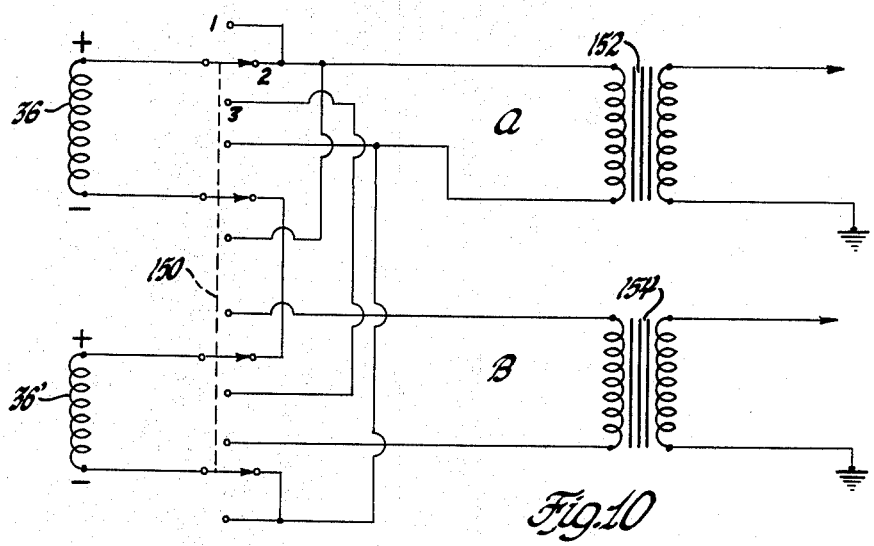
Figure 11:
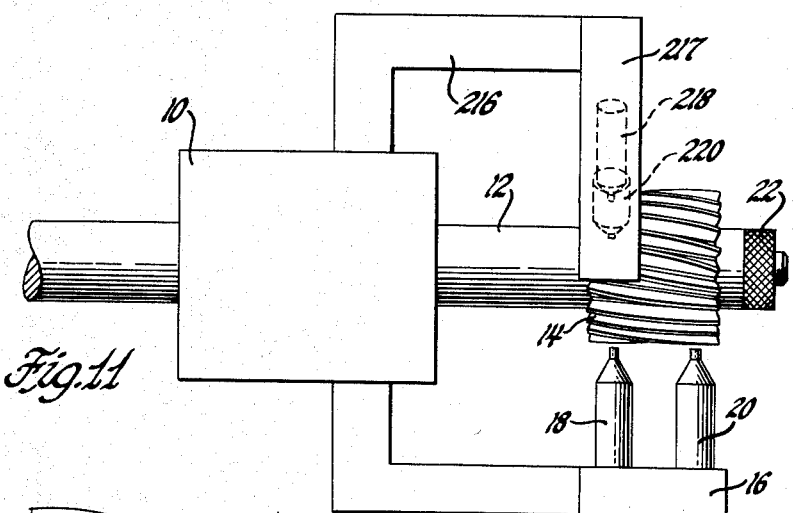
Figure 12:
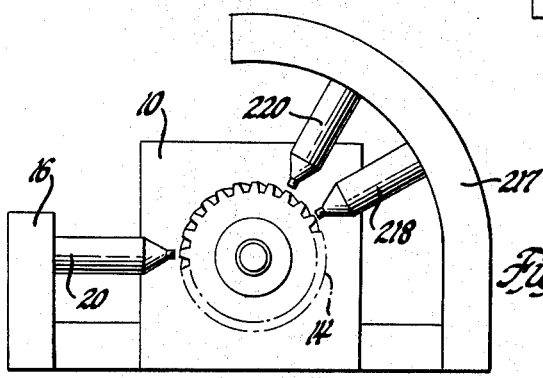

FIGS. 6, 6a and 6b; 7, 7a and 7b; 8, 8a and 8b; and FIG. 9 are electrical wave forms developed by the pickups for various gear irregularities;

FIG. 10 is an electrical schematic diagram of a prefered manner in which the pickups may be electrically interconnected;

FIG. 11 is a diagrammatic plan view of the mechanical components of a modified form of gear inspection apparatus in accordance with the present invention; and FIG. 12 is an end view of the gear inspection apparatus of FIG. 11.

Figure 1:
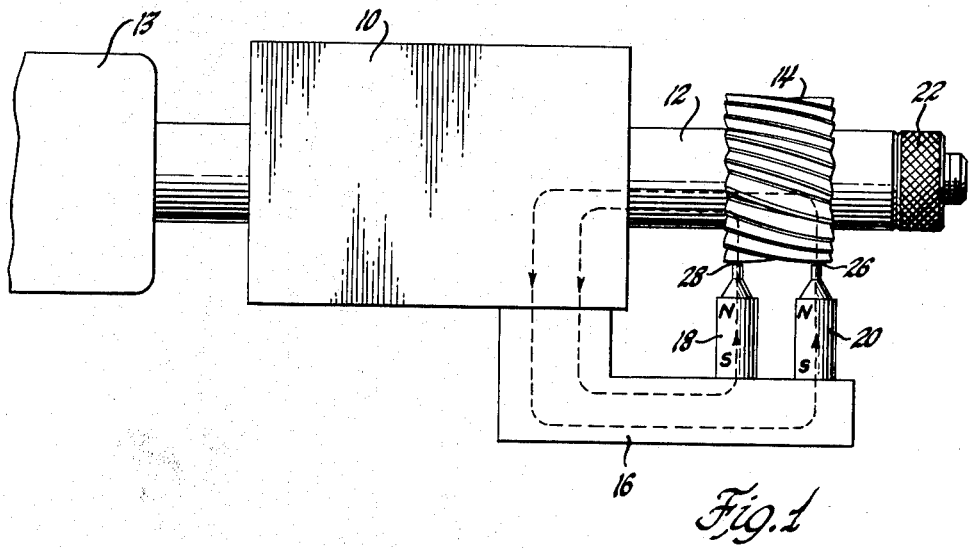
FIG. 1 is a diagrammatic plan view of the mechanical components of a gear inspection apparatus in accordance with the present invention.

Referring to the drawings, the mechanical components of the gear inspection apparatus shown in FIG. 1 include a stationary arbor support 10, a true-running shaft 12 rotatably driven by motor 13. The shaft 12 has the gear 14 under inspection secured thereto. A pickup support 16 is suitably attached to the arbor support and has a pair of radially directed pickups 18 and 20, which are spaced axially of and located at the ends of the gear in parallel transaxial planes substantially as shown. The tips of the pickups are contained in a fixed reference plane or on a line that is spaced from and is parallel to the axis of the shaft, the geometrical and rotational axes of which will coincide if the shaft and its support are true-running, as specified herein. The rotational axis of the gear or member under inspection necessarily coincides with the axis of the shaft whereby the tips of the pickups will be equally spaced from the rotational axis of the gear under inspection.

Figure 2:
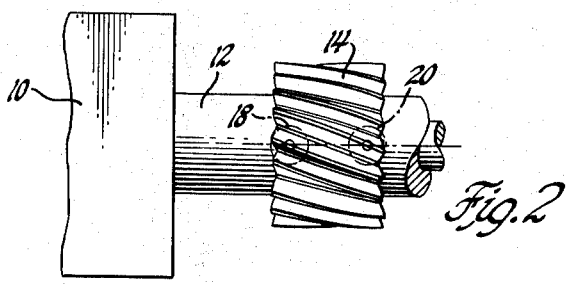
FIG. 2 is a view illustrating the location of the pickups relative to a gear under inspection.

The arbor shaft 12 is driven at one end by a constant speed or synchronous motor through suitable reduction gearing and has a knurled nut 22 on a threaded reduced portion on the other end thereof for retaining the gear against an annular shoulder thereon. In the case of a helical gear, one pickup is centered over a tooth at one end of the gear and the other pickup is centered over preferably an adjacent tooth at the other end of the gear, as shown in FIG. 2, so that the pickups survey the same relative parts of the two adjacent teeth on the gear. The pickups are similarly poled and spaced slightly from the tips of the gear teeth by the air gaps 26, 28 which are included in the closed magnetic circuit paths shown by the dotted lines in FIG. 1 extending from the tip or pole piece of each pickup, through the air gaps, the gear, the shaft and its support, the pickup support and back to the tips of the respective pickups. Except for the air gas, the magnetic circuit paths of the pickups extend entirely through ferromagnetic material, including the gear under inspection. It should be further noted that the manner in which the pickups are associated with and mounted from the arbor support provides a separate magnetic circuit which includes but one air gap for each pickup and assures a high flux value in the circuit for high sensitivity operation.

Figure 3:
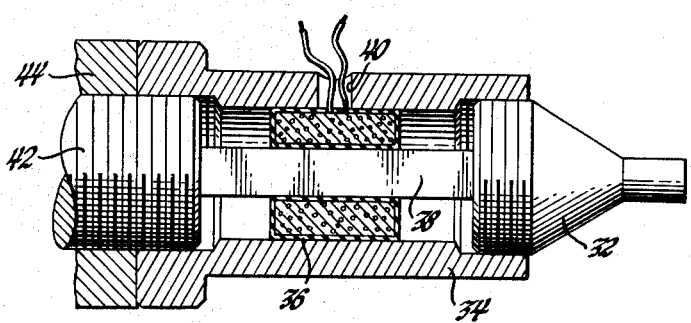
FIG. 3 is a detail view illustrating the construction of the pickups of the present invention.

As best shown in FIG. 3, each of the pickups includes an iron tipped pole piece 32 threadably received in one end of a cylindrical brass body 34 which houses a coil 36 mounted on a permanent bar magnet 38, such as Alnico. An opening 40 is provided in the cylindrical body portion 34 through which the coil terminals are brought outside of the body for connection to the external measuring apparatus, shortly to be described. The body is threadably received on a threaded plug 42 on one end of the cross arm of an iron support 44 forming a part of the pickup support.

The gear thus forms with each magnetic pickup a gear tooth generator, the output of which will be a periodically varying alternating current signal having a frequency equal to the product of the number of gear teeth and the speed of the gear. The wave shape of the signal will be a function of the rate of change of magnetic flux between the pickup and the gear and is affected by various factors including gear tooth shape, the spacing of the pickup from the teeth, and the movement or rotational speed of the gear relative to the pickup. For a gear having 30 teeth and driven at a speed of, say 800 r.p.m., each pickup will generate a signal having a frequency of 400 cycles per second. FIGS. 6, 6a and 6b illustrate the wave forms developed by a single pickup for various gear irregularities. FIG. 6 illustrates the wave shape obtained by a single pickup for a badly formed or slip gear in which the gear teeth are mis-shapen and are of non-uniform width. FIGS. 6a and 6b illustrate wave forms such as might be obtained by a single pickup for an eccentric gear and a wobble gear, both of which exhibit an amplitude modulated wave output. The existence of eccentricity or wobble in the gear varies the width of the air gap between the pickup and the gear, affecting the reluctance of the magnetic circuit path thereof, and appears as a low frequency modulation component carried by the relatively higher frequency gear tooth signal.

Since the wave forms of FIGS. 6a and 6b are generally similar, it ordinarily will be difficult to distinguish between eccentric and wobble gears where but a single pickup is employed. Accordingly, the dual pickup arrangement described is employed in the present invention, and the outputs of the pickups are connected electrically in series adding or opposing relation in order to differentiate between eccentric and wobble gears. For an eccentric gear, the pickups will develop similar voltages and, with their coils connected in series opposing relation, will yield substantially zero resulting voltage. Under these conditions, any significant output with differentially connected pickups will indicate that the gear is a wobble gear rather than an eccentric one.

Figure 4:
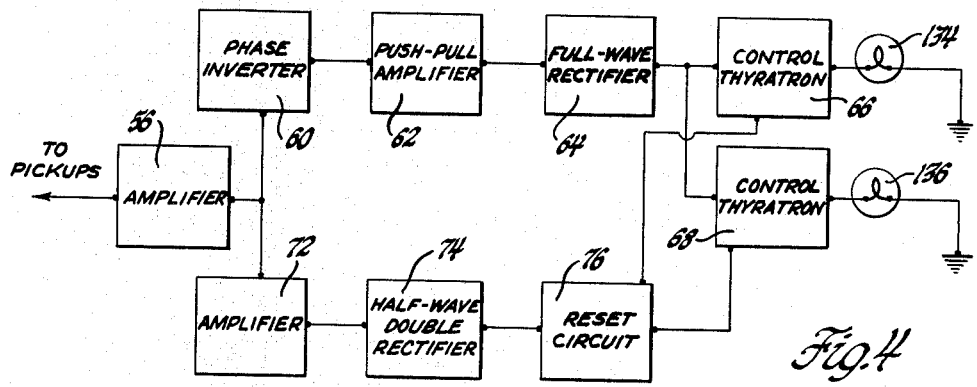
FIG. 4 is a single line block diagram illustration of suitable detecting, measuring and indicating apparatus that may be employed in the present invention.

After the pickups have been connected alternately in series adding and in series opposing relation for a preliminary eccentricity or wobble determination and it has been established that the gear is an eccentric one rather than a wobble gear, the pickups may again be connected in series adding relation or the output of a single pickup may be employed for application to suitable detecting apparatus, such as that contained in FIG. 4, to recover the modulation component from the modulated gear tooth signal. The amplitude of the modulation component will be a measure of the amount of eccentricity in the gear and may be applied to suitable electrical means to be measured, as by a vacuum tube voltmeter and/or be displayed on the screen of a cathode ray oscilloscope.

Figure 7:
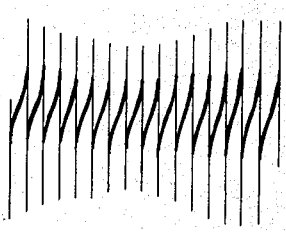
Figure 7A:
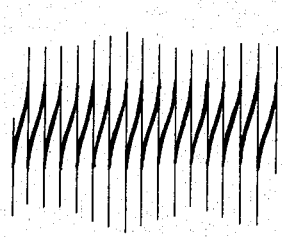
Figure 7B:
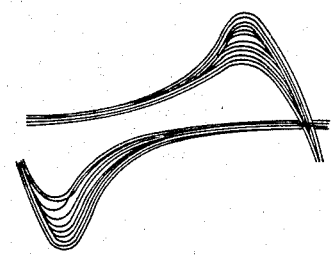
Figure 8:
Figure 8A:
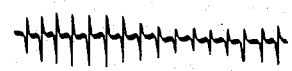
Figure 8B:
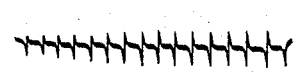

FIGS. 7 and 7a illustrate wave forms developed by two different types of wobble gears, the wave of FIG. 7 having a one-cycle modulation component, while that of FIG. 7a having a two-cycle component for one revolution of the gear. The wave of FIG. 7 is produced by a wobble gear, the rotational axis of which crosses the geometrical axis beyond the length of or outside of the gear in a plane containing these axes or projections thereof, while the two-cycle modulation component or envelope of the wave of FIG. 7a is produced by a wobble gear in which the rotational axis crosses the geometrical axis within the length of the gear. FIG. 7b is a different form of wave that is obtained by adjusting the sweep rate of the oscilloscope to a frequency equal to twice gear tooth frequency so as to superimpose each of the individual gear teeth patterns and illustrates that the variations in the signals developed by the pickups for a wobble gear are mainly amplitude variations rather than phase. The latter form of variations are characteristic of mis-shapen or slip gears which produce differences in phase rather than the amplitude between the outputs of the pickups, as shown in FIG. 9. FIGS. 8, 8a and 8b are oscillograms showing the differential signal from dual pickups for bad, intermediate and good gears.

Figure 3A:
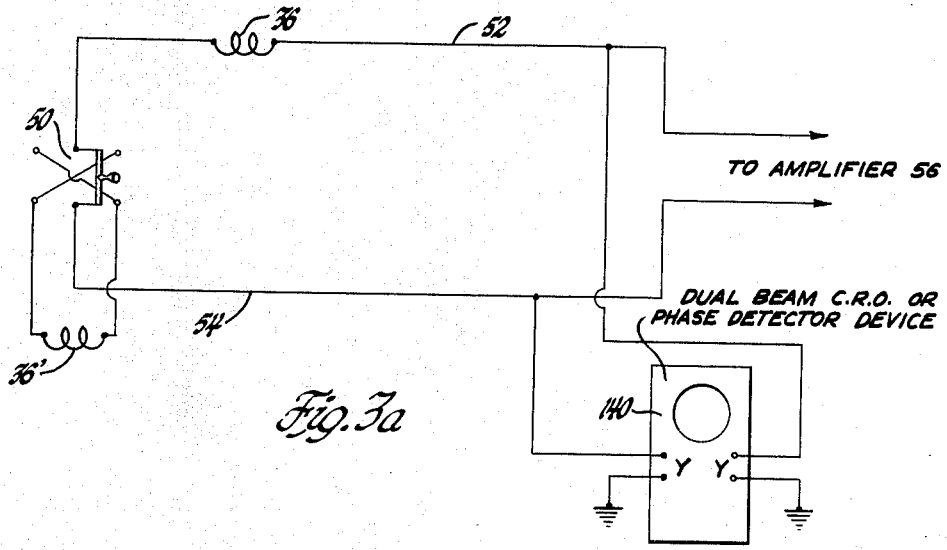
FIG. 3a is an electrical schematic diagram illustrating the manner in which the pickups may be electrically interconnected.

Referring to FIGS. 3a, 4 and 10, there is shown a suitable form of magnetic gear inspection apparatus that may be employed with the pickups of the present invention for indicating various manufacturing errors and faults therein. FIG. 3a represents in a general way a simple electrical circuit by which the pickup coils 36, 36' can be connected electrically in series adding or opposing relation by a D.P.D.T. reversing switch 50 to supply a resulting cumulative or differential signal over conductors 52, 54 to the input of a low frequency amplifier 56 shown in FIG. 4.

A preferred form of pickup circuit is shown in FIG. 10 which includes a ganged rotary, four-pole, three-point selector switch 150 and a pair of audio frequency, step-up transformers 152 and 154 to supply the pickup signals either individually or combinedly to suitable utilizing means to be described. With the poles of switch 150 in position 1, the pickups 36 and 36' will be connected in individual circuits A and B to the inputs of transformers 152 and 154, respectively. The transformer secondaries may be connected to a different set of the two pairs of vertical input terminals of a dual beam cathode ray oscilloscope. In position 2 of the switch 150, the pickups are connected additively and supply their combined output through transformer 152 to amplifier 56, while in position 3, a differential pickup signal is applied through the transformer 152 to the amplifier.

Amplifier 56 should have a good low frequency response characteristic over a frequency range corresponding to the range of gear tooth frequencies for the different forms or types of gears to be accommodated by the apparatus. The output of the amplifier 56 is connected over a pair of parallel circuit branches which include a detecting and measuring or indicating circuit branch and a reset circuit branch. The detecting and indicating circuit branch includes, in the relative order named, a conventional phase inverter 60 for converting from a single ended input to a balanced, double ended output, a push-pull amplifier 62 followed by a full wave rectifier 64, the output of which is applied to the inputs of a pair of control thyratrons 66 and 68. The lower reset circuit branch includes an amplifier 72 which may be similar to the amplifier 56, a half-wave voltage doubler rectifier 74 and a reset circuit 76.

Figure 5:
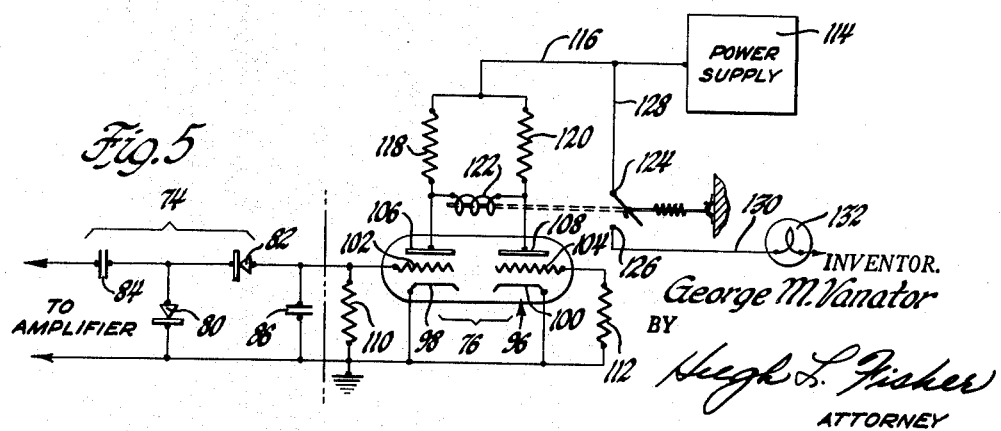
FIG. 5 is a schematic electrical circuit diagram of a part of the apparatus of FIG. 4.

The rectifier 74 and reset circuit 76 are shown schematically in FIG. 5 in which the voltage doubler rectifier 74 is connected to receive the alternating current output of amplifier 72 and includes a pair of selenium diodes or rectifiers 80, 82 and their associated charging condensers 84, 86 connected substantially as shown to develop a rectified, direct current output signal that is approximately equal to twice the amplitude of the alternating current input thereto. The reset circuit 76 includes a differential amplifier constituted by a double triode vacuum tube 96 having a pair of cathodes 98, 100; grids 102, 104; and plates 106, 108, as shown. The output of the half-wave voltage double rectifier 74 is applied to the input of the first section of the differential amplifier between the control grid 102 and the grounded cathode 98 thereof. Resistor 110 is connected across the input of the first section of the differential amplifier tube 96, as shown. The cathode 100 of the second section of the differential amplifier is grounded and its control grid 104 is fixed relative to ground through resistor 112.

Operating voltage is supplied to the plates 106 and 108 of the differential amplifier tube 96 from an electronically regulated power supply unit, shown by the block diagram 114, over conductor 116 and voltage dropping resistors 118 and 120. Connected between the plates 106 and 108 is the holding coil 122 of a sensitive relay having a pair of normally open contacts 124, 126 that are connected in circuit controlling relationship in an operating voltage supply circuit which includes conductor 128 connected to conductor 116 from the power supply, relay contacts 124 and 126, and conductor 130 connected to the plates of the control thyratrons 66 and 68 in the detecting and signaling branch circuit of FIG. 4.

With no input voltage to the half-wave doubler rectifier 74, the control grids of the differential amplifier tube 96 of the reset circuit will be connected to ground through their resistors 110 and 112, and both sections of the tube will be in the same conducting condition with their plates 106 and 108 at the same potential. The relay coil 122 will thus be de-energized and its contacts 124 and 126 will open the operating or B+ voltage supply line 130 to the plates of the control thyratrons. The parameters of the reset circuit and the inspection system are so designed that the resulting voltage developed by the pickups for a standard or substantially perfectly formed gear of negligible eccentricity and wobble will be sufficient to cause the control grid 102 of the reset circuit to swing relative to the grid 104, thus unbalancing the respective sections of the normally balanced differential amplifier of the reset circuit and placing the plates 106 and 108 at different potentials so as to create a difference of potential across the relay coil 122 to energize the same and close the operating voltage supply circuit to the plates of the control thyratrons 66 and 68.

A signal lamp 132 is shown in conductor 130 of the operating voltage supply circuit of the control thyratrons and is illuminated when the relay contacts 124 and 126 are closed. Instead of locating the lamp 132 directly in the supply conductor 130, the lamp may be operated from a low voltage supply controlled through a separate set of contacts of the relay 122, if desired. Similar signal lamps 134 and 136 are provided in the output circuits of the control thyratrons 66 and 68 and are caused to be illuminated upon conduction of the respective thyratrons. Control thyratron 66 is biased to conduct when the amplitude of the modulation component of the pickup voltage attains the level assigned to a gear having an intermediate amount of eccentricity or wobble therein, while the control thyratron 68 is biased to conduct at a higher voltage level corresponding to that assigned to a gear possessed of excessive eccentricity or wobble. At the conclusion of the test when the arbor shaft stops spinning the outputs of the pickups will be zero and the reset circuit 76 will again be balanced, causing relay contacts 124 and 126 to open and placing the thyratrons in nonconducting condition.

The system may be so designed that for a good gear of minimum eccentricity or wobble, only lamp 132 will be illuminated, while both lamps 132 and 134 will be illuminated for an intermediate gear, and all three lamps 132, 134 and 136 will be illuminated for a bad gear. In place of, or in addition to the signal lamps, the outputs of the control thyratrons and the reset circuit can be connected in circuit controlling relation with auxiliary utilization means.

Since wobble gears and slip gears both produce varying amounts of difference voltage with differentially connected pickups, it may be difficult in some instances to distinguish between wobble and helix angle variations, so far as the outputs of the pickups may be concerned. In the case of badly formed slip gears, such gears may be detected visually. With the apparatus of the present invention, however, it is possible to differentiate between wobble and helix angle variations by connecting the individual output of the pickups to the dual vertical input sections of a two-gun cathode ray oscilloscope, shown at 140, having an internally synchronized horizontal sweep rate corresponding to the rotational speed of the gear on the arbor shaft. Any difference of phase between the two signals will produce wave traces corresponding to that shown in FIG. 9, signifying that the gear is a slip gear. If the gear is a wobble gear, the traces will correspond to that shown in FIG 7b in which the variations are mainly amplitude and not phase.

In place of a dual beam or other equivalent double trace cathode ray oscilloscope, suitable phase detecting or discriminating apparatus and measuring or display means can be connected to the outputs of the pickups to detect phase differences therebetween.

Since the pickups of FIG. 1 are responsive to eccentricity and wobble, a somewhat more satisfactory detection of slip gear phenomenon can be obtained by the addition of two separate pickups 218, 220 which are oriented with respect to the gear as shown in FIGS. 11 and 12. These pickups are mounted in a support 216, which is united to the arbor support 10 with the wobble detector and has an arcuate portion 217 that overhangs the gear. The auxiliary pickups are mounted radially from the portion 217 with their axes contained in a transaxial plane to the gear. Electrically, the pickups 218 and 220 are connected in series opposing relation and detect primarily the phase difference between alternate gear teeth. If wanted, the pickups 218 and 220 can be individually connected to the oscilloscope 140, as described relative to pickups 18 and 20, so as to produce the FIGURE 9 traces in the event of helix angle variations.

The apparatus of FIGURES 3a, 4 and 10 can, of course, still be used with the two sets of pickups 18 and 20 and 218 and 220. It merely requires that suitable provision be made for replacing the outputs of the pickups 18 and 20 with the outputs of the pickups 218 and 220. In other words, the coils 36 and 36' are selectively replaced with those of the pickups 218 and 220 in any known way. If the phase detector device or oscilloscope 140 in FIGURE 3a is employed, the results obtained when they are helix angle variations will depend on how the pickups 218 and 220 are connected. If connected as mentioned, the FIGURE 9 traces will be produced; but, if connected in series opposition, the resultant differential output indicates an error or phase difference and the extent. Of course, if there is no error, the outputs cancel.

Since there may be a substantial leakage of flux between the tips of the slip gear pickups if they were mounted too closely over adjacent gear teeth, these pickups are shown in FIG. 11 as mounted preferably over alternate gear teeth.

By reason of their transaxial orientation, the pickups 218, 220 will cancel out the effects of wobble and eccentricity. However, large amplitude differences shown in FIG. 6 are also detected by these pickups and will cause the measuring system to reject a slip gear on this basis when the differences in phase are not predominant, although it is important to note that it is phase rather than ampliude variations which are of primary concern in the slip gear detector.

While the pickups of the wobble and/or eccentric gear detector have been shown and described herein as associated with adjacent gear teeth, satisfactory results can be obtained in most cases where the pickups are mounted over alternate teeth.

I claim:

1. Apparatus for measuring the amount of helix angle variation in gear wheels and the like comprising the combination of means rotatably supporting a test gear wheel on its rotational axis, drive means rotating the gear wheel on its rotational axis, a pair of electrical pickups spaced slightly from and positioned over the tips of different gear wheel teeth, the pickups being disposed in a plane transverse to the rotational axis of the gear wheel and generating alternating electrical signals due to relative movement betwen the pickups and the gear wheel, the alternating electrical signals having a phase reflecting the helix angle of a tooth, and means phase comparing the electrical signals and developing a corresponding output reflecting helix angle variations.

2. In combination, an arbor support, a true running shaft rotatably supported by said arbor support and adapted to receive thereon a gear wheel to be tested for dimensional irregularities, support means combined with the arbor support and extending in the direction of the gear wheel, a pair of electromagnetic pickups mounted on the support means and arranged in a common plane transverse to the rotational axis of the gear wheel, means rotating the gear wheel relative to the pickups, the ends of the pickups each being spaced slightly from the tips of a different gear wheel tooth so as to form gaps therebetween, the pickups each being operative to develop an alternating output of a phase reflecting the helix angle of a tooth, and means operative in response to the electromagnetic signals generated by variations in the gaps during rotation of the gear wheel to phase compare the electromagnetic signals so as to develop an indication of helix angle variations.

3. Apparatus for determining tooth spacing errors in a gear comprising means revolvably supporting the gear, a pair of pickups, a support for positioning the pickups radially about the gear at circumferentially disposed locations and in a plane transverse to the rotational axis of the gear whereby the pickups will be juxtaposed to the surface of the gear and form therewith a pair of independent air gaps, the pickups being magnetized with similar polarities to form parallel magnetic circuits each of which includes one of the air gaps, means rotating the gear relative to the pickups so that each pickup develops alternating signals of phases reflecting the individual variations of the reluctances of the associated circuit resulting from variations in the air gaps occurring during relative movement between the corresponding pickup and the gear, and means phase comparing the alternating signals from each pickup and developing an output indicating helix angle variations.

4. Apparatus for determining the amount of helix angle variation in gear wheels and the like comprising means rotating the gear wheel about its rotational axis at a relatively constant speed, a pair of pickups disposed in a plane normal to the rotational axis of the gear wheel and at a pair of points spaced slightly from the tips of different teeth on the gear wheel to thereby generate alternating electrical signals of phases reflecting helix angles of the teeth as the gear wheel is rotated, means differentially combining the generated electrical signals so as to develop a corresponding output, and means sensing the amplitude of the output so as to facilitate the detection of helix angle variations when a phase comparison is ineffective.

5. In combination, an arbor support, a true running shaft rotatably supported by the arbor support and adapted to receive thereon a gear wheel to be tested for helix angle variations, support means combined with the arbor support and extending forwardly thereof in the direction of the gear wheel, means rotating the gear wheel about its rotational axis at a relatively constant speed, a pair of electrical pickups mounted on the support means and arranged in a common plane normal to the rotational axis of the gear wheel, means rotating the gear wheel relative to the pickups, the ends of the pickups being spaced slightly from the tips of the teeth on the gear wheel and being positioned over alternate teeth thereof so as to form air gaps therebetween, each of the pickups presenting a magnetic pole of the same polarity to the adjacent surface of the gear wheel so as to generate an electrical signal of a phase reflecting the helix angle of the teeth, means connecting the pickups in series opposing relation so as to phase compare the electrical signals from each pickup and develop a corresponding difference output, and indicating means responsive to the difference output generated by the variations in the gaps during rotation of the gear wheel so as to indicate helix angle variations in the gear wheel.

6. Apparatus for checking dimensional irregularities in gear wheels and the like, comprising the combination of means supporting a test gear wheel for rotation on its rotational axis, means coupled to the gear wheel for rotating the gear wheel on its rotational axis, a first pair of electrical pickups generating electrical signals proportional to the variations in the spacing between the tips of the gear wheel teeth and a fixed reference line, which is parallel to the rotational axis of the gear wheel, at a pair of axially spaced points on the reference line near the ends of the gear wheel, a second pair of electrical pickups positioned within a common plane transverse to the rotational axis of the gear wheel and also generating electrical signals indicating passage of the gear wheel teeth, and utilizing means responsive to the electrical signals generated by the pickups due to relative movement between the gear wheel and the first and second pair of pickups.

7. Apparatus for checking dimensional irregularities in gear wheels and the like comprising the combination of means supporting the gear wheel for rotation on its rotational axis, means coupled to the gear wheel for rotating a gear wheel on its rotational axis, a first pair of electrical pickups generating electrical signals proportional to the variations in the spacing between the tips of the gear wheel teeth and a fixed reference line, which is parallel to the rotational axis of the gear wheel, at a pair of axially spaced points on the reference line near the ends of the gear wheel, a second pair of electrical pickups disposed in a common plane transverse to the rotational axis of the gear wheel and so arranged as to generate electrical signals corresponding to the spacing between the tips of the gear wheel teeth and the pickups, means combining the electrical signals from each of the first and second pairs of electrical pickups, and utilizing means connected to the combining means and responsive to the electrical signals from each of the first and second pair of pickups.

8. Apparatus for measuring variations in gear wheels and the like comprising the combination of means rotatably supporting a test gear wheel on its rotational axis, drive means rotating the gear wheel on its rotational axis, a first pair of axially spaced electrical pickups generating electrical signals proportional to variations in the spacing between the tips of the gear wheel teeth and a fixed reference line, which is parallel to the rotational axis of the gear wheel, at a pair of axially spaced points on the reference line near the ends of the gear wheel, the first pair of pickups being centered over the tips of different gear teeth, means combining the signals from the first pair of pickups, means responsive to the combined signal to thereby indicate wobble and eccentricity errors in the gear wheel, a second pair of electrical pickups disposed in a common plane transverse to the rotational axis of the gear wheel and arranged so as to generate electrical signals indicating passage of the teeth, means connecting the second pair of pickups in series opposing relation, and indicating means responsive to the signals from the second pair of electrical pickups so as to indicate helix angle variations in the gear wheel.

9. In combination, an arbor support, a true running shaft rotatably supported by the arbor support and being arranged to receive thereon a gear wheel to be tested for dimensional irregularities, support means associated with the arbor support and extending in the direction of the gear wheel, a first pair of electrical pickups mounted by the support means and extending transversely to the gear wheel, the ends of the first pair of pickups being spaced slightly from the tips of the gear wheel teeth and being centered over different gear wheel teeth so as to form air gaps therebetween, the first pair of pickups being spaced axially of the gear wheel and located near the opposite ends thereof, a second pair of electrical pickups mounted on the support means so as to be disposed in a common plane transverse to the axis of rotation of the gear wheel, the ends of the second pair of pickups being also spaced slightly from the tips of the gear wheel teeth and being situated over alternate gear wheel teeth so as to form air gaps therebetween, each of the pairs of pickups presenting a magnetic pole of the same polarity to the adjacent surface on the gear wheel, and indicating means responsive to the electromagnetic signals generated by the variations in the gaps during rotation of the gear wheel.

10. In combination, an arbor support, a true running shaft rotatably supported by the arbor support and being arranged to receive thereon a gear wheel to be tested for dimensional irregularities, support means associated with the arbor support and extending in the direction of the gear wheel, a first pair of electrical pickups mounted by the support means and extending transversely to the gear wheel, the ends of the first pair of pickups being spaced slightly from the tips of the gear wheel teeth and being centered over different gear wheel teeth so as to form air gaps therebetween, the first pair of pickups being spaced axially of the gear wheel and located near the opposite ends thereof, a second pair of electrical pickups mounted on the support means so as to be disposed in a common plane normal to the axis of rotation of the gear wheel, the ends of the second pair of pickups being also spaced slightly from the tips of the gear wheel teeth and being situated over alternate gear wheel teeth so as to form air gaps therebetween, each of the pair of pickups presenting a magnetic pole of the same polarity to the adjacent surface on the gear wheel, and utilizing means responsive to the electromagnetic signals generated by the variations in the gaps during rotation of the gear wheel so that the first pair of pickups causes wobble and eccentricity errors to be determined and the second pair of pickups causes helix angle variations to be detected.

References Cited by the Examiner

UNITED STATES PATENTS

| | | | |
|---|---|---|---|
| 2,124,579 | 7/1938 | Knerr et al. | 324—40 |
| 2,457,727 | 12/1948 | Rifenbergh | 73—162 |
| 2,805,677 | 9/1957 | Baird | 73—462 |

FOREIGN PATENTS

| | | |
|---|---|---|
| 172,283 | 8/1952 | Austria. |
| 209,793 | 1/1924 | Great Britain. |

WALTER L. CARLSON, *Primary Examiner.*

ROBERT EVANS, *Examiner.*